United States Patent
Draznin et al.

(10) Patent No.: US 9,838,481 B2
(45) Date of Patent: Dec. 5, 2017

(54) PROVISIONING OF NETWORK COMMUNICATION PARAMETERS BASED ON DEVICE TYPE

(71) Applicants: Verizon Patent and Licensing Inc., Arlington, VA (US); Cellco Partnership, Arlington, VA (US)

(72) Inventors: Sagiv Draznin, Walnut Creek, CA (US); Lalit R. Kotecha, San Ramon, CA (US); Haim S. Ner, Fair Lawn, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 725 days.

(21) Appl. No.: 13/849,366

(22) Filed: Mar. 22, 2013

(65) Prior Publication Data

US 2014/0289383 A1 Sep. 25, 2014

(51) Int. Cl.
*G06F 15/177* (2006.01)
*H04L 29/08* (2006.01)
*H04L 29/06* (2006.01)

(52) U.S. Cl.
CPC .......... *H04L 67/141* (2013.01); *H04L 67/303* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 6,633,542 B1* | 10/2003 | Natanson | ............ | H04L 12/5601 370/235 |
| 7,325,075 B1* | 1/2008 | Chiu | ................. | H04L 29/12028 709/227 |
| 7,840,593 B2* | 11/2010 | Nomura | .................. | H04L 67/16 707/770 |
| 9,641,249 B2* | 5/2017 | Kaneriya | ............... | H04B 10/25 |
| 2004/0012196 A1* | 1/2004 | Sundqvist | ............ | G06Q 20/201 283/81 |
| 2008/0276006 A1* | 11/2008 | Choi | ................... | H04L 61/2015 709/245 |
| 2010/0034120 A1* | 2/2010 | Nakajima | ............. | H04W 48/08 370/255 |
| 2012/0089713 A1* | 4/2012 | Carriere | .............. | H04L 12/4641 709/222 |
| 2012/0252481 A1* | 10/2012 | Anpat | ..................... | H04W 8/06 455/456.1 |

(Continued)

*Primary Examiner* — Younes Naji (57) ABSTRACT

The device type of a user computing device may be used to optimize network communication sessions. In one implementation, an indication of the device type of the user computing device may be received and a communication profile for the user computing device may be determined. The communication profile may be associated with values for a number of parameters relating to one or more communication protocols used to implement communication sessions with the user computing device. One or more network elements, that are involved in the communication sessions with the user computing device, may be provisioned, to cause the one or more network elements to implement the communication protocols, for the user computing device, using the values for the parameters relating to the one or more communication protocols.

20 Claims, 8 Drawing Sheets

(56) References Cited

U.S. PATENT DOCUMENTS

| | | | |
|---|---|---|---|
| 2012/0322498 A1* | 12/2012 | Nogawa | H04W 76/068 455/525 |
| 2013/0107783 A1* | 5/2013 | Shaw | H04W 4/06 370/312 |
| 2013/0167196 A1* | 6/2013 | Spencer | H04W 8/22 726/3 |
| 2014/0073367 A1* | 3/2014 | Chou | H04W 4/14 455/466 |
| 2014/0098740 A1* | 4/2014 | Xing | H04W 4/001 370/328 |
| 2014/0204910 A1* | 7/2014 | Muller | H04W 36/0083 370/331 |
| 2014/0281018 A1* | 9/2014 | Waclawsky | H04L 47/193 709/235 |

* cited by examiner

| Device Type | Comm Profile |
|---|---|
| Mobile Device | Profile1 |
| USB Tethered Device | Profile2 |
| PC/Laptop | Profile3 |

| Comm Profile | Profile Parameters |
|---|---|
| Profile1 | - receive buffer (fixed)<br>- send buffer (automatic)<br>- window scaling (enabled)<br>- SACK (disabled)<br>- MTU discovery (enabled)<br>- TCP Congestion Avoidance Algorithm: Vegas |
| Profile2 | - receive buffer (automatic)<br>- send buffer (fixed)<br>- window scaling (disabled)<br>- SACK (enabled)<br>- MTU discovery (disabled)<br>- TCP Congestion Avoidance Algorithm: cubic |
| Profile3 | - receive buffer (fixed)<br>- send buffer (fixed)<br>- window scaling (enabled)<br>- SACK (enabled)<br>- MTU discovery (enabled)<br>- TCP Congestion Avoidance Algorithm: Vegas |

PROVISIONING OF NETWORK COMMUNICATION PARAMETERS BASED ON DEVICE TYPE

Transmission Control Protocol (TCP) is a commonly used protocol, in the Internet Protocol (IP) suite, that provides data transmission services to application programs. For example, when an application program desires to send data, instead of breaking the data into smaller pieces and issuing a series of IP requests, the application program may issue a single request to a TCP component. The TCP component may, in turn, handle IP-related tasks associated with transmitting the data (e.g., breaking the data into smaller pieces and issuing multiple IP requests to transmit the data).

A user device, such as a mobile phone or computer, when attached to a data network, may create TCP sessions with other user devices or servers in the network. The performance of a TCP session may depend on parameters that are associated with the TCP session. For example, different TCP sessions may be associated with different congestion avoidance control algorithms and buffering strategies.

DETAILED DESCRIPTION OF PREFERRED EMBODIMENTS

The following detailed description refers to the accompanying drawings. The same reference numbers in different drawings may identify the same or similar elements.

Techniques described herein may provide for the customization of network sessions, such as TCP sessions, based on the device type of a device that attaches to a network. The device type may correspond to the hardware associated with a device. In one implementation, devices may be classified into categories, such as, for example: (1) a category for mobile communication devices such as smart phones; (2) a category for computers such as personal computers or laptops; and (3) a category for USB tethered devices (such as a cellular modem tethered via a USB port). For each category, a communication profile may be maintained, in which the communication profile may include one or more network parameters, such as TCP parameters, that may be applied to network sessions established with the corresponding device. In this manner, network communication sessions may be optimized on a per-device basis and based on the hardware associated with the device.

Figure 1:
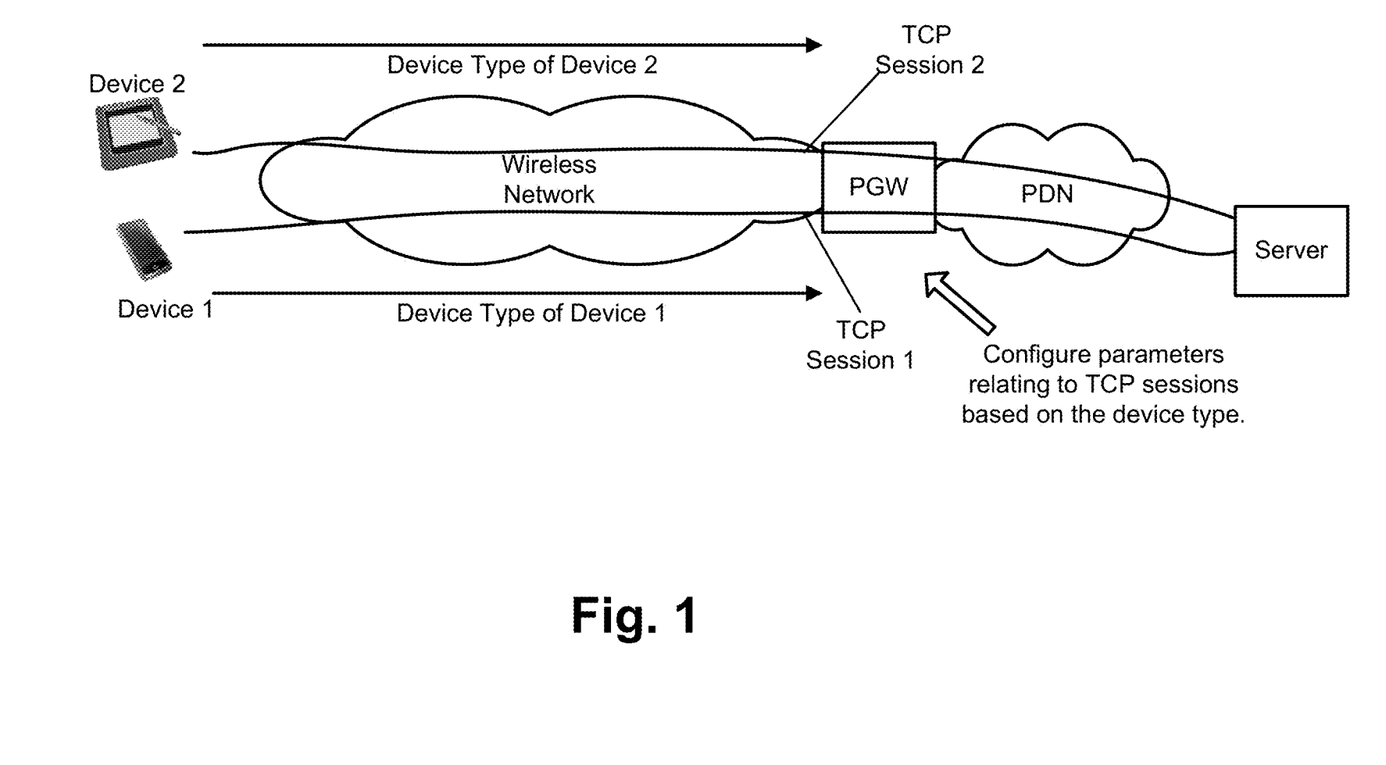
FIG. 1 is a diagram conceptually illustrating an example of an overview of concepts described herein.

FIG. 1 is a diagram conceptually illustrating an example of an overview of concepts described herein. As shown in FIG. 1, user computing devices, such as a mobile phone or smart phone ("Device 1") and a tablet computing device ("Device 2"), may connect to a server ("Server"), such as a web server, to obtain network data services. The network data services may be provided through one or more network connections, such as TCP sessions. As illustrated, a wireless network, such as a cellular network, may provide connectivity for the user computing devices to a packet data network (PDN), such as the Internet. A PDN gateway (PGW) may connect the wireless network to the PDN.

The user computing devices may connect, through the PGW, to the PDN. Consistent with aspects described herein, when initially requesting a PDN connection from the PGW, the user computing devices may inform the PGW of a device type (e.g., a smart phone, tethered USB device, laptop computer, etc.) associated with the user computing device. Based on the device type of the user computing device, the PGW may determine a communication profile that is to be associated with the user computing device. In one implementation, the communication profile may contain one or more parameters, relating to TCP sessions. The PGW may provision one or more network devices based on the parameters. The TCP sessions with each of the user computing devices (e.g., "TCP Session 1" and "TCP Session 2") may then be implemented with the parameters that correspond to the communication profile associated with the device type of the user computing device. The TCP sessions may thus be optimized for the device type. The efficiency and/or effectiveness of the TCP sessions may be improved.

In some implementations, the communications profiles, in addition to being based on the device type, may alternatively or additionally be selected based on usage patterns of the user computing devices. For example, a particular user computing device that is streaming video content may be associated with a different communication profile (or with different network policies) than the same user computing device performing general web surfing.

Although aspects described herein are discussed with respect to parameters relating to TCP sessions, in other implementations, similar techniques may be applied to customize other network protocols. For example, communication profiles may be used to store, in addition to or in the alternative, parameters relating to user datagram protocol (UDP) communications.

Figure 2:
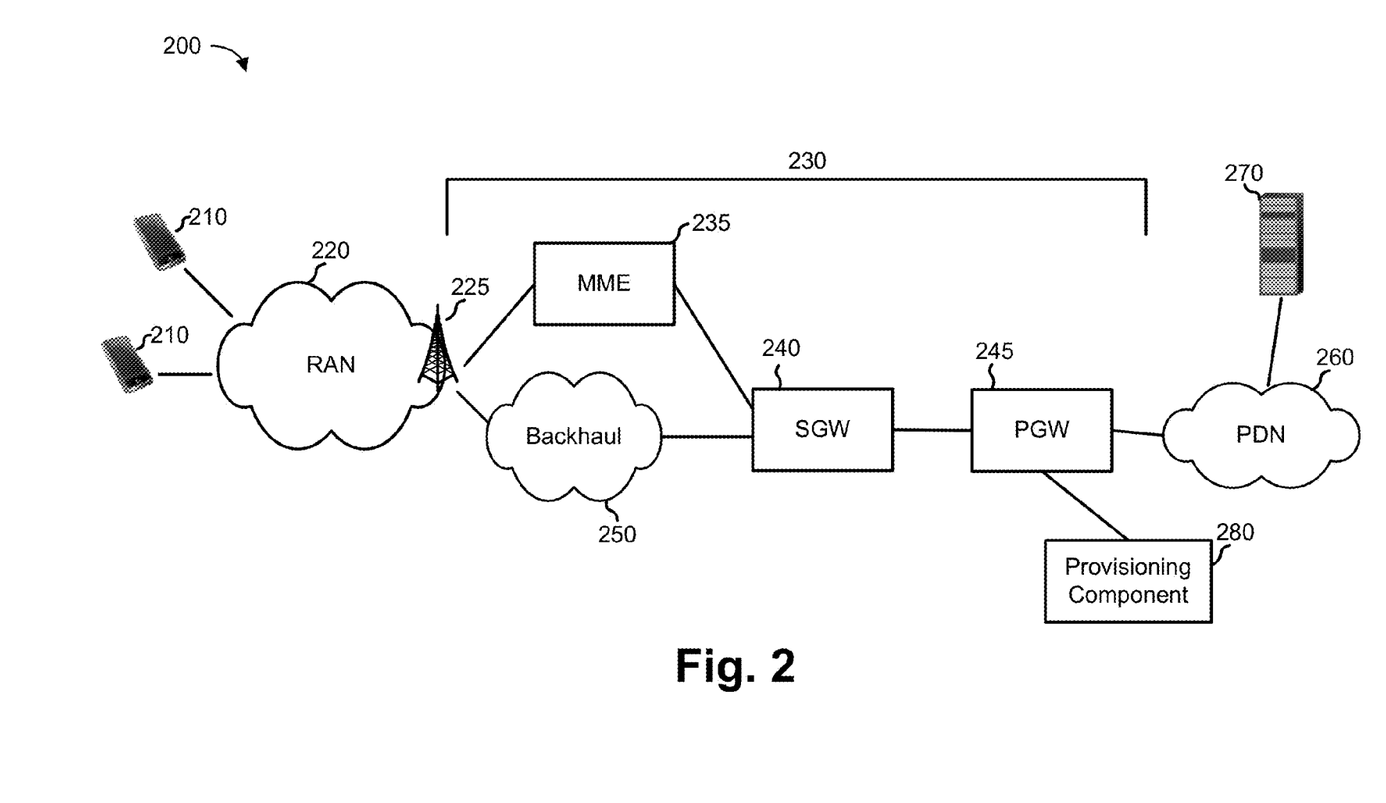
FIG. 2 is a diagram of an example environment in which systems and/or methods described herein may be implemented.

FIG. 2 is a diagram of an example environment 200 in which systems and/or methods described herein may be implemented. Environment 200 may correspond to an environment in which user computing devices connect to a network via a wireless interface (e.g., a cellular wireless network). As illustrated, environment 200 may include one or more user equipment (UE) devices 210, a radio access network (RAN) 220, a core wireless network 230, a PDN 260, a server 270, and a provisioning component 280.

UEs 210 (which may correspond to the user computing devices shown in FIG. 1) may include portable computing and communication devices, such as a personal digital assistant (PDA), a smart phone, a cellular phone, a laptop computer with connectivity to a cellular wireless network, a tablet computer, etc. UEs 210 may also include non-portable computing devices, such as desktop computers, consumer or business appliances, set-top devices (STDs), or other devices that have the ability to connect to RAN 220. UEs 210 may connect, through a radio link, to RAN 220. Through the radio link, user computing devices 210 may obtain data and/or voice services. UEs 210 may be capable of reporting a device type, corresponding to the UE 210, the network. RAN 220 may include one or more devices that include radio interfaces to provide wireless connections to UEs 210. In one implementation, RAN 220 may include a radio access network for a cellular network, such as an LTE (long term evolution) network. RAN 220, as illustrated, may include one or more base stations, which, in the context of an LTE network, may be referred to as an Evolved Node B (eNodeB) 225. Each eNodeB 225 may provide a radio interface over which the eNodeB may communicate with UEs 210. The radio interfaces provided by RAN 220 may include, for example, orthogonal frequency-division multiplexing (OFDM) and/or single-carrier frequency-division multiple access (SC-FDMA) SC-FDMA based radio interfaces.

Core wireless network 230 may include one or more networks of any type, such as a local area network (LAN), a WAN, and/or a metropolitan area network (MAN). In one implementation, core wireless network 230 may implement an LTE network. In this situation, core wireless network 230 may be implemented using a flat, IP-based network architecture that includes one or more network devices or components that facilitate the providing of network access to UEs 210. Core wireless network 230 may connect to one or more other networks, such as to PDN 260, to provide network service to UEs 210.

As illustrated in FIG. 2, core wireless network 230 may include a number of network elements, including mobility management entity (MME) 235, serving gateway (SGW) 240, and packet data network gateway (PGW) 245. MME 235, SGW 240, and PGW 245 may be connected to one another, and to other devices, through one or more networks that are local to core wireless network 230. For example, a backhaul network 250, which may include an Ethernet backhaul network, may be used to connect eNodeB 225 to SGW 240.

MME 235 may include one or more computation and communication devices that perform signaling for core wireless network 230. MME 235 may, for example, be responsible for authenticating UEs 210, maintaining location information for UEs 210, and selecting a PGW 245 to service a particular UE 210. SGW 240 may include one or more computation and communication devices that route and forward user data packets. SGW 240 may also act as a mobility anchor during inter-eNodeB 225 handoffs. PGW 245 may include one or more computation and communication devices that provide connectivity from UEs 210 to external PDNs.

As is further illustrated in FIG. 2, PGW 245 may be coupled to an external network, such as PDN 260. PDN 260 may be an external packet data network, such as the Internet or another public or private network. Servers, such as server 270, and/or other devices, may be connected to PDN 260.

Server 270 may include one or more computation and communication devices that provide data and/or computing services to connecting devices, such as to UEs 210. Server 270 may include, for example, a web server, a file server, or another type of server. In one implementation, when communicating with UEs 210, server 270 may use the TCP protocol.

Provisioning component 280 may include one or more computation and communication devices that assist in provisioning communication sessions, such as TCP sessions, between UEs 210 and server 270. Consistent with aspects described herein, provisioning component 280 may determine a device type of UEs 210, and based on the determined device type, configure parameters in network devices to implement network sessions that are optimized based on the device type. Provisioning component 280 may, for example, configure parameters, relating to TCP or UDP sessions, at UEs 210, eNodeBs 225, SGW 240, PGW 245, server 270, and/or other network elements (e.g., network routers or firewalls). Provisioning component 280 may, in some implementations, output these parameters to PGW 245, which may then configure the parameters in the network elements. Although illustrated as being separate from PGW 245, in some implementations, the functionality of provisioning component 280 may be implemented as part of PGW 245 or as part of other network elements in wireless core network 230. The operation of provisioning component 280 will described in more detail below.

Figure 3:
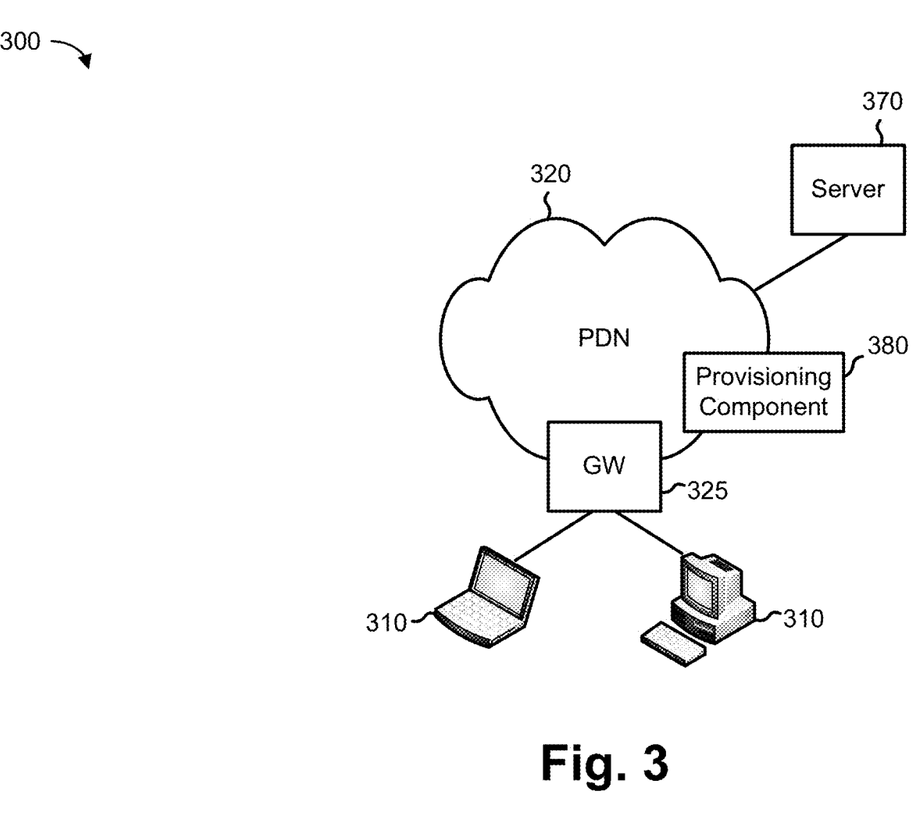
FIG. 3 is a diagram of another example environment in which systems and/or methods described herein may be implemented.

FIG. 3 is a diagram of another example environment, environment 300, in which systems and/or methods described herein may be implemented. Environment 300 may correspond to an environment in which the user computing devices connect to a network via a wired interface (e.g., a wired cable or fiber optical connection). As illustrated, environment 300 may include one or more user computing devices 310, a PDN 320, a gateway (GW) 325, a server 370, and a provisioning component 380.

User computing devices 310 may include computing and communication devices, such as a personal digital assistant (PDA), a smart phone, a cellular phone, a laptop computer, a personal computer, a tablet computer, etc. User computing devices 310 may connect to PDN 320 via a wired connection, such as a coaxial cable connection fiber-optic connection. In some implementations, user computing devices 310 may wirelessly connect, such as through a local wireless network (e.g., a WiFi network), to a local router which may then connect to PDN 320.

PDN 320 may be a packet data network similar to PDN 260. Connectivity to PDN 320 may be controlled by a gateway 325. Gateway 325 may include an edge router, firewall, dedicated gateway device, or other network device that may control access to PDN 320.

Server 370 may include one or more computation and communication devices that provide data and/or computing services to connecting devices, such as to user computing devices 310. Server 370 may include, for example, a web server, a file server, or another type of server. In one implementation, when communicating with user computing devices 310, server 370 may use the TCP or UDP protocols.

Provisioning component 380 may include one or more computation and communication devices that assist in provisioning communication sessions, such as TCP or UDP sessions, between user communication devices 310 and server 370. Provisioning component 380 may generally function similarly to provisioning component 280. Thus, provisioning component 380 may determine a device type of user computing devices 310, and based on the determined device type, configure parameters in network devices to implement network sessions that are optimized based on the device type. Although illustrated as being separate from GW 325, in some implementations, the functionality of provisioning component 380 may be implemented as part of GW 325 or as part of another network element associated with PDN 320. The operation of provisioning component 380 be described in more detail below.

Although FIGS. 2 and 3 illustrate example components of environments 200 and 300, in other implementations, environments 200 and 300 may contain fewer components, different components, differently arranged components, or additional components than those depicted in FIGS. 2 and 3. Alternatively, or additionally, one or more components of environments 200 and 300 may perform one or more other tasks described as being performed by one or more other components of environments 200 and 300.

Figure 4A:
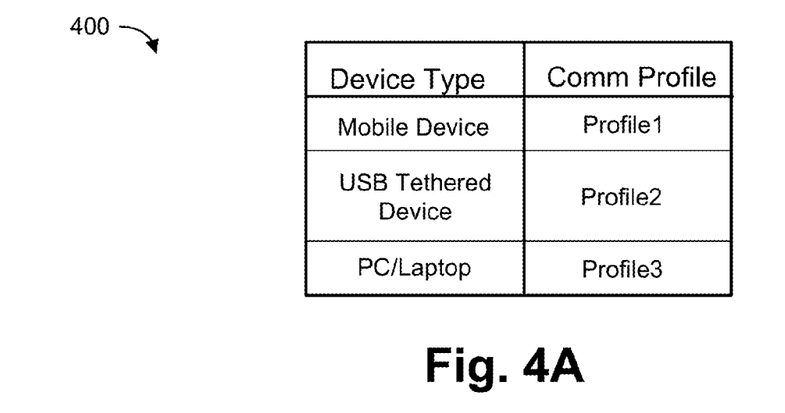
FIG. 4A is a diagram illustrating an example data structure that may be used to store communication profiles associated with different device types.

FIG. 4A is a diagram illustrating an example data structure 400 that may be used to store communication profiles associated with different device types. As previously mentioned, different user computing devices may be classified as different device types based on the hardware associated with the user computing devices. Data structure 400 may maintain communication profiles for each potential device type. In one implementation, data structure 400 may be maintained by PGW 245 and/or GW 325.

In one implementation, and as illustrated in data structure 400, three different device types may be supported. For example, the device types may include a mobile device type, a USB tethered device type, and a personal computer (PC)/laptop device type. The mobile device type may include mobile communication devices, such as smart phones, cell phones, tablet computing computer devices, etc. The USB tethered device type may include devices that are tethered to another device through a USB interface or another interface (e.g., a Bluetooth interface, an 802.11x wireless interface, or another type of interface). For example, a 3G/4G USB connection device may be designed to connect to wireless core network 230 to provide network connectivity, via a USB connection, to a laptop or other computing device. The USB tethered device type may also include other devices that are designed to be connected, via USB or another interface, to another computing device (e.g., a USB data logger, mobile hotspot, etc.). The PC/laptop device type may include traditional personal computing devices such as laptops and desktop computers.

Each of the device types, illustrated in data structure 400, may be associated with a communication profile. In one implementation, each communication profile may be a data structure that includes one or more parameters relating to TCP and/or UDP sessions. An example of possible parameters that may be included for various communication profiles will be discussed below with reference to FIG. 4B. In data structure 400, the mobile device type, the USB tethered device type, and the PC/laptop device type are illustrated as being associated with the communication profiles labeled as "Profile1," "Profile2," and "Profile3," respectively.

Figure 4B:
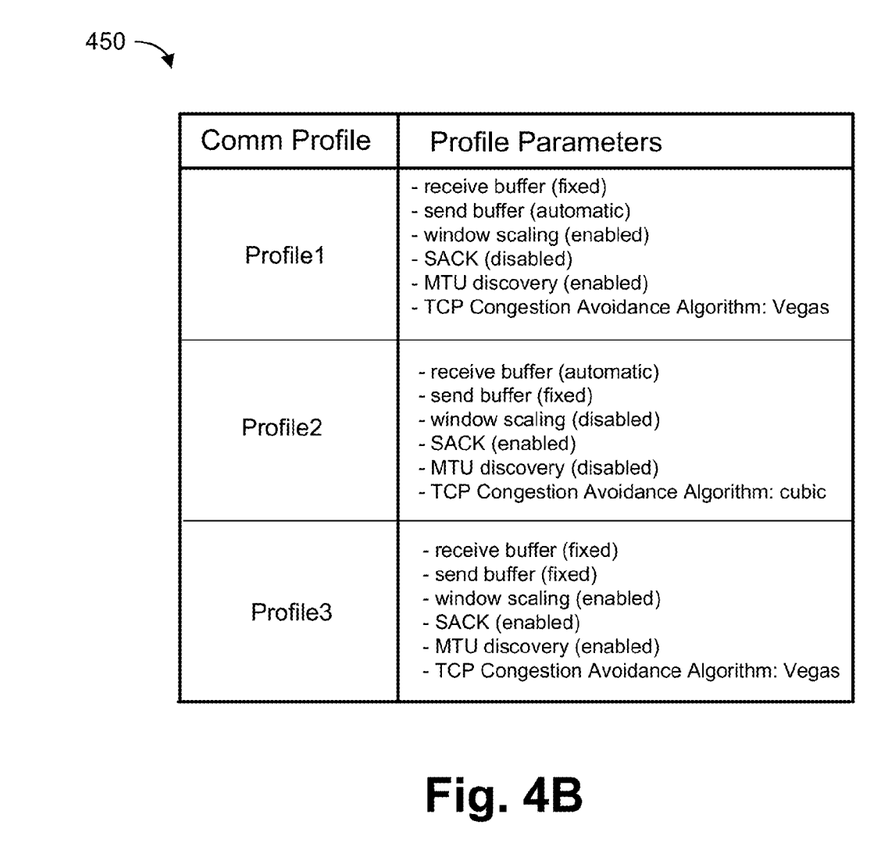
FIG. 4B is a diagram illustrating an example data structure that may be used to store details relating to the communication profiles maintained in the data structure of FIG. 4A.

Three example device types are illustrated in FIG. 4A. In other implementations, additional or fewer device types could be implemented. For example, the mobile device type may be further divided into different types of mobile devices, such as a first mobile device type for smart phones having a minimum screen size or processing capability, and a second mobile device type for smart phones that do not meet the minimum screen size or processing capability. In general, when defining different device types, it can be desirable to define device types such that devices, associated with a particular device type, tend to share common traits with respect to communication sessions (e.g., TCP, UDP, etc.) established with the devices. For example, certain device types, such as the USB tethered device type, may tend to transmit relatively small (e.g., 41 byte) TCP messages. Other device types, such as the PC/laptop device type, may tend to transmit much larger TCP messages. In this situation, parameters for the communication profiles corresponding to these two device types may be set to optimize TCP sessions for relatively small TCP messages (in the case of the USB tethered device type) and for larger TCP messages (in the case of the PC/laptop device type). The parameters for the communication profiles may be obtained, for example, from a network administrator. FIG. 4B is a diagram illustrating an example data structure 450 that may be used to store details relating to the communication profiles maintained in data structure 400. As illustrated in data structure 450, each of the communication profiles shown in data structure 400 (e.g., Profile1, Profile2, and Profile3), may be associated with a number of communication parameters, such as communication parameters relating to the establishment and/or implementation of TCP sessions.

In the example of data structure 450, each communication profile may include profile values relating to the following TCP parameters: whether a receive buffer is of a fixed size or whether the size is automatically determined; whether a send buffer is of a fixed size or whether the size is automatically determined; whether window scaling (a TCP option to increase the receive window size above 65,535 bytes) is enabled or disabled; whether TCP selective acknowledgement (SACK) is enabled or disabled; whether TCP maximum transmission unit (MTU) discovery is enabled or disabled; and the particular TCP congestion avoidance algorithm to use (e.g., the Vegas or cubic congestion avoidance algorithm). This set of TCP parameters is exemplary. Additional, fewer, or other TCP parameters (or parameters relating to other network protocols) may alternatively be included as part of each communication profile.

As an example of a communication profile, consider the profile labeled Profile1 in FIGS. 4A and 4B, which may correspond to the mobile device type. This communication profile may specify the following TCP related options: the receive buffer is set to a fixed size, the send buffer is set to automatic size determination, TCP window scaling is enabled, TCP SACK is disabled, MTU discovery is enabled, and the Vegas TCP congestion avoidance algorithm is used.

Figure 5:
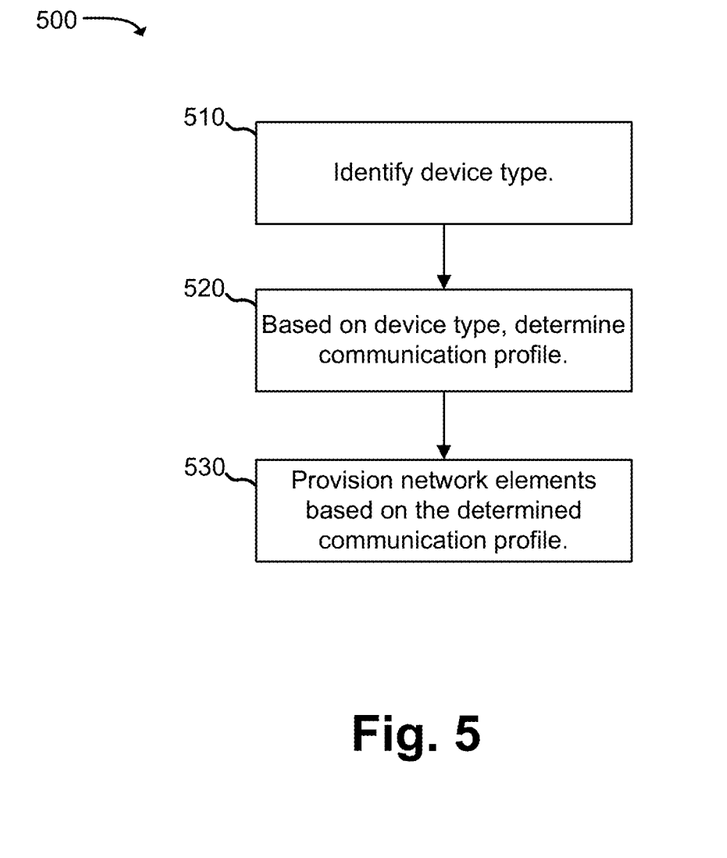
FIG. 5 is a flowchart illustrating an example process for provisioning of network parameters based on device type.

FIG. 5 is a flowchart illustrating an example process 500 for provisioning of network parameters based on device type. Process 500 may be performed, for example, by provisioning component 280/380. In one implementation, process 500 may be performed on a per user computing device basis (i.e., process 500 may be performed for each user computing device).

Process 500 may include identifying the device type of a user computing device (block 510). In one implementation, the device type may be identified when the user computing device initially attaches to a network, such as to PDN 260 or PDN 320. For example, as part of the negotiation, with PGW 245 or GW 325, to attach to the corresponding PDN, the user computing device and PGW 245/GW 325 may communicate using the Address Resolution Protocol (ARP) to resolve network layer addresses into link layer addresses. The user computing device may set, as part of an ARP message, a field that identifies the hardware relating to the user computing device. The ARP message may be forwarded from PGW 245/GW 325 to provisioning component 280/380.

For example, an ARP message may include a 48-bit field, called the sender hardware address (SHA) field. The SHA field may include a value identifying the device type of the user computing device. For example, the user computing device may include a value in the SHA field that directly identifies the device type category of the user computing device (e.g., mobile device type, USB tethered device type, PC/laptop device type). Alternatively or additionally, the value in the SHA field may include other hardware identification information (e.g., processor capabilities, memory capacity, supported communication protocols, etc.) that may be used to infer the device type of the user computing device.

In other implementations, other techniques may be used to identify the device type of a particular user computing device. For example, provisioning component 280/380 may store an indication of the device type corresponding to user computing devices may connect to PGW 245/GW 325. In this case, provisioning component 280/380 may look up the device type based on the identificaation information (e.g., the mobile phone number or IMEI (International Mobile Station Equipment Identity) number associated with the user computing device).

Process 500 may further include, based on the identified device type, determining a communication profile for the device (block 520). As previously mentioned, in one implementation, provisioning component 280/380 may maintain a data structure, such as data structure 400, associating each possible device type to a communication profile for the device type. Provisioning component 280/380 may thus lookup the communication profile in data structure 400.

As previously mentioned, in one implementation, the communication profile may include one or more parameters relating to a particular network communication protocol, such as parameters relating to TCP and/or UDP sessions that may be established with or by the user computing device. In other implementations, the communication profile may include parameters relating to other communication protocols or to the configuration of the various network devices that may provide network services to the user computing device.

Process 500 may further include provisioning network elements based on the determined communication profile (block 530). For example, provisioning component 280/380 may configure parameters, according to the communication profile, relating to TCP and/or UDP sessions at one or more network devices. The one or more network devices may include, for example, UEs 210, eNodeBs 225, SGW 240, PGW 245, server 270, GW 325, server 380, and/or other network elements (e.g., network routers or firewalls). The network devices may be configured to implement TCP and/or UDP sessions, with the particular user computing devices, using the values in the communication profile. In this manner, network communication sessions can be optimized based on the user device type.

Figure 6:
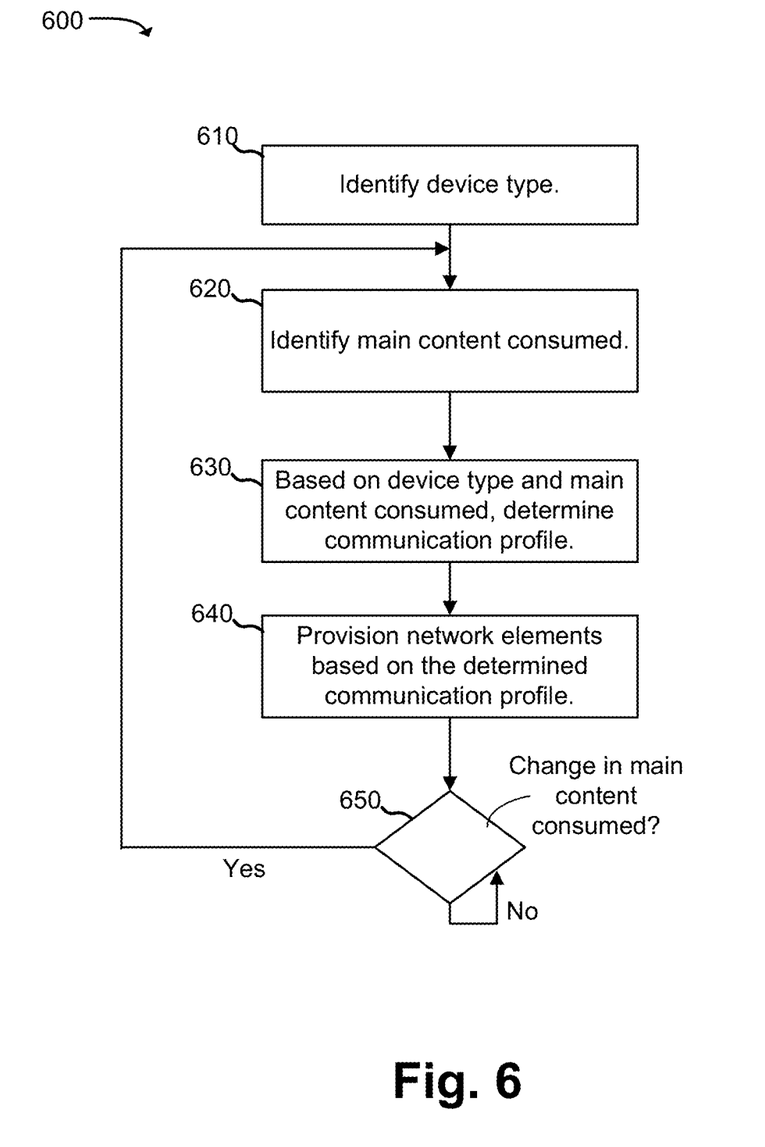
FIG. 6 is a flowchart illustrating another example process for provisioning of network parameters based on device type.

FIG. 6 is a flowchart illustrating another example process 600 for provisioning of network parameters based on device type. Process 600 may be performed, for example, by provisioning component 280/380. In one implementation, process 600 may be performed on a per user computing device basis (i.e., process 600 may be performed for each user computing device). Process 600 may determine a communication profile to use based on the device type and additionally based on usage activity of the user computing device.

Process 600 may include identifying the device type of a user computing device (block 610). In one implementation, the device type may be identified when the user computing device initially attaches to a network, such as PDN 260 or PDN 320. As previously mentioned, the device type of a user computing device may be explicitly communication, such as via a field in an ARP message. Alternatively or additionally, other techniques may be used to determine the device type of the user computing device.

Process 600 may further include identifying the main content that is consumed (e.g., received) by the user computing device (block 620). In general, in block 620, usage patterns of the user computing device may be determined. For example, the user computing device may, at a particular time, be primarily used to receive streaming video, perform file downloading, or perform basic web surfing. The main content that is being consumed (e.g., in this example, video content, file downloading, or web content) may be relevant to the optimization of TCP and/or UDP sessions for the user computing device.

In some implementations, the main content that is consumed, by the user computing device, may be determined by direct analysis of network traffic. For example, provisioning component 280/380 and/or PGW 245/GW 325 may monitor traffic (e.g., may inspect headers and/or payloads of packets) between the user computing device and the PDN to determine whether the user computing device is primarily engaged in video streaming, basic web browsing, or file downloading. In other implementations, other techniques may be used to determine the main content that is consumed. For example, the user computing device may transmit a message indicating that main content that is to be consumed (e.g., before beginning the streaming of a movie, the user computing device may transmit a message indicating video streaming is about to begin).

Process 600 may further include, based on the identified device type and the main content that is to be consumed, determining a communication profile for the device (block 630). In one implementation, the communication profile may be primarily chosen based on the main content being consumed (if known). If the main content being consumed is unknown or not clearly determinable, the communication profile may be determined based on the device type. In another possible implementation, each combination of device type and main content being consumed may correspond to a particular communication profile.

Figure 7:
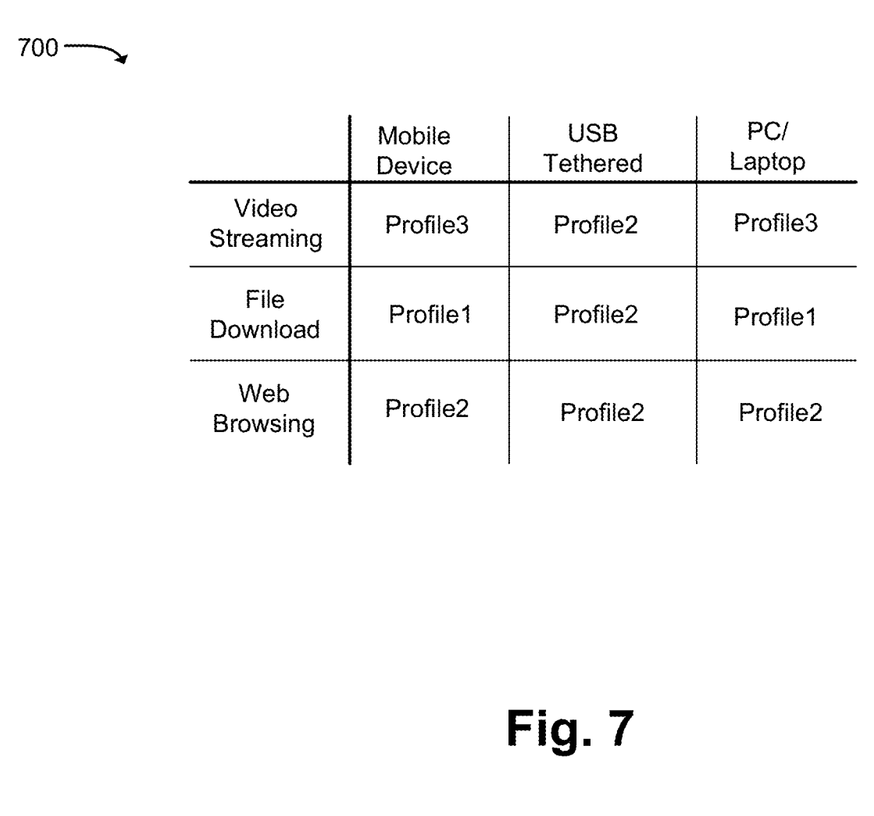
FIG. 7 is a diagram of an example matrix that may be used to determine a communication profile based on the device type and the main content that is consumed.

FIG. 7 is a diagram of an example matrix 700 that may be used to determine (at block 630) a communication profile based on the device type and the main content that is consumed. In this example, the device type may be expressed as one of three possible categories (mobile device type, USB tethered device type, PC/laptop device type) and the main content may be expressed as one of three possible category types (video streaming, file download, simple web browsing). Matrix 700 may provide a corresponding communication profile (labeled as Profile1, Profile2, and Profile3) for each possible combination of device type and main consumed content type.

As particularly illustrated in FIG. 7, for the device type "mobile device" and the content category "video streaming," the communication profile "Profile1" may be used. The communication profiles for other combinations of device type/content category are also illustrated in matrix 700.

Referring back to FIG. 6, process 600 may further include provisioning network elements based on the determined communication profile (block 640). For example, provisioning component 280/380 may, according to the communication profile, configure parameters relating to TCP and/or UDP sessions at one or more network devices. The one or more network devices may include, for sample, UEs 210, eNodeBs 225, SGW 240, PGW 245, server 270, GW 325, server 380, and/or other network elements (e.g., network routers or firewalls). [Output . . . ]

It may be possible that the main content that is consumed, by the user computing device, may occasionally change. Process 650 may include determining or detecting a change in the main content being consumed (block 650). For example, provisioning component 280/380 may periodically determine the type of content that is mainly being consumed by the user computing device. When a change is detected (block 650—YES), the process of blocks 620, 630, and 640 may be repeated.

As described above, TCP/UDP settings may be adjusted, for user computing devices, based on a type of the user computing device. In one implementation, sets of TCP/UDP parameters may be associated with communication profiles that may be assigned on a per device basis. In other implementations, usage patterns associated with the user computing devices may also be taken into account when selecting a communication profile and/or setting network policy for a user computing device.

Figure 8:
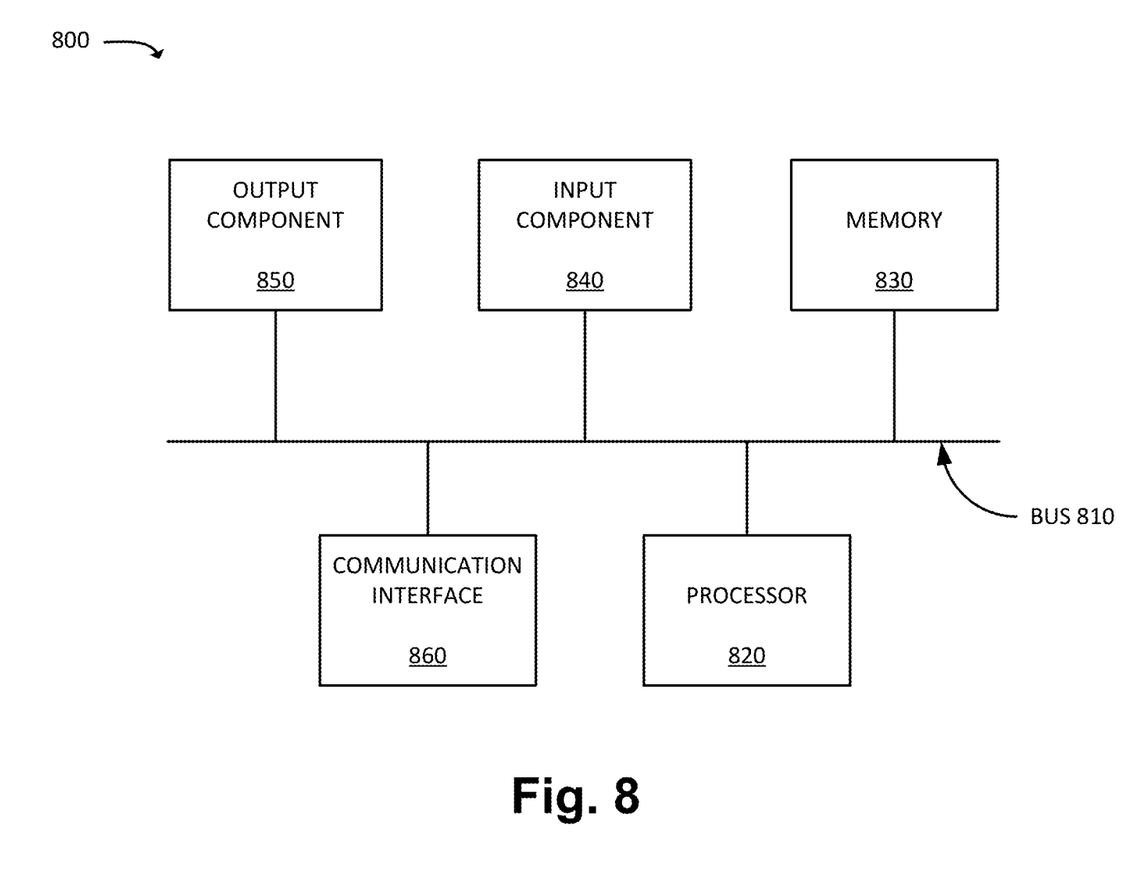
FIG. 8 is a diagram of example components of a device.

FIG. 8 is a diagram of example components of a device 800. Each of the devices illustrated in FIGS. 1, 2, and 3 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 5 and 6 the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method, implemented by a gateway device for a network, the method comprising:

receiving, by the gateway device and from a user computing device, an indication of a device type of the user computing device, wherein the device type corresponds to a hardware category of the user computing device, the indication being received, by the gateway device, as part of an attachment procedure via which the gateway device connects the user computing device to an external packet data network;

determining, by the gateway device and based on the device type of the user computing device, a communication profile for the user computing device, the communication profile associated with values for a plurality of parameters that are used to control operation of Transmission Control Protocol (TCP) communication sessions with the user computing device the plurality of parameters including an indication of whether TCP window scaling is enabled and an indication of a particular TCP congestion avoidance algorithm to use; and provisioning, by the gateway device, one or more network elements, including the gateway device, that are involved in the TCP communication sessions with the user computing device, to cause the one or more network elements to implement the TCP communication sessions, for the user computing device, using the values of the plurality of parameters.

2. The method of claim 1, wherein determining the communication profile further includes:
   determining the communication profile based on a usage pattern of data consumed by the user computing device.

3. The method of claim 1, wherein the receiving of the indication of the device type occurs during initial attachment of the user computing device to the external packet data network.

4. The method of claim 1, wherein the receiving of the indication of the device type further includes: receiving the indication of the device type as a field that is communicated, from the user computing device, as part of an Address Resolution Protocol (ARP) message.

5. The method of claim 4, wherein the field of the ARP message includes a sender hardware address (SHA) field.

6. The method of claim 1, wherein the hardware category of the device type includes one of a predetermined set of device type categories.

7. The method of claim 1, wherein the device type is selected from a set of hardware categories that include a category corresponding to a mobile device, a category corresponding to tethered devices, and a personal computer/laptop category.

8. A gateway device for a network, comprising; a memory; and at least one processor to execute instructions in the memory to:
   receive, an indication of a device type of a user computing device, wherein the device type corresponds to a hardware category of the user computing device, the indication being received, by the gateway device, as part of an attachment procedure via which the gateway device connects the user computing device to an external packet data network,
   determine, based on the device type of the user computing device, a communication profile for the user computing device, the communication profile being associated with values for a plurality of parameters that are used to control operation of Transmission Control Protocol (TCP) communication sessions with the user computing device, the plurality of parameters including an indication of whether TCP window scaling is enabled and an indication of a particular TCP congestion avoidance algorithm to use, and
   provision, one or more network elements, including the gateway device, that are involved in the TCP communication sessions with the user computing device, to cause the one or more network elements to implement the TCP communication sessions, for the user computing device, using the values of the plurality of parameters.

9. The gateway device of claim 8, wherein, when determining the communication profile, the at least one processor is to further execute instructions in the memory to:
   determine the communication profile based on the device type of the user computing device and based on usage pattern of data consumed by the user computing device.

10. The gateway device of claim 8, wherein the receiving of the indication of the device type occurs during initial attachment of the user computing device to the external packet data network.

11. The gateway device of claim 8, wherein, when receiving of the indication of the device type, the at least one processor is to further execute instructions in the memory to:
   receive the indication of the device type as a field that is communicated, from the user computing device, as part of an Address Resolution Protocol (ARP) message.

12. The gateway device of claim 11, wherein the field of the ARP message includes a sender hardware address (SHA) field.

13. The gateway device of claim 8, wherein the hardware category of the device type includes one of a predetermined set of device type categories.

14. The gateway device of claim 8, wherein the device type is selected from a set of hardware categories that include a category corresponding to a mobile device, a category corresponding to tethered devices, and a personal computer/laptop category.

15. A method, implemented by a gateway device for a network, the method comprising:
   receiving, by the gateway device and from a user computing device, an indication of a device type of the user computing device, wherein the device type corresponds to a hardware category of the user computing device, the indication being received, by the gateway device, as part of an attachment procedure via which the gateway device connects the user computing device to an external packet data network;
   determining, by the gateway device, a usage pattern of data consumed by the user computing device;
   determining, by the gateway device and based on the device type of the user computing device and the determined usage pattern of the data consumed by the user computing device, a communication profile for the user computing device, the communication profile associated with values for a plurality of parameters that are used to control operation of Transmission Control Protocol (TCP) communication sessions with the user computing device, the plurality of parameters including an indication of whether TCP window scaling is enabled and an indication of a particular TCP congestion avoidance algorithm to use;
   provisioning, by the gateway device, one or more network elements, including the gateway device, that are involved in the TCP communication sessions with the user computing device, to cause the one or more network elements to implement the TCP communication sessions, for the user device, using the values of the plurality of parameters;
   detecting, by the gateway device, a change in the usage pattern of the data consumed by the user computing device; and
   updating, by the gateway device, the provisioning of the one or more network elements based on the change in the usage pattern of the data consumed by the user computing device.

16. The method of claim 15, wherein the receiving of the indication of the device type occurs during initial attachment of the user computing device to the external packet data network.

17. The method of claim 15. wherein the receiving of the indication of the device type further includes:
   receiving the indication of the device type as a field that is communicated, from the user computing device, as part of an Address Resolution Protocol (ARP) message.

18. The method of claim 17, wherein the field of the ARP message includes a sender hardware address (SHA) field.

19. The method of claim 15, wherein the hardware category of the device type includes one of a predetermined set of device type categories.

20. The method of claim 15, wherein the device type is selected from a set of hardware categories that include a category corresponding to a mobile device, a category corresponding to tethered devices, and a personal computer/laptop category.

* * * * *